(12) United States Patent
Hoppe

(10) Patent No.: US 12,722,743 B2
(45) Date of Patent: Sep. 1, 2026

(54) BUMPER SYSTEMS FOR SNOWMOBILES

(71) Applicant: Arctic Cat Inc., Thief River Falls, MN (US)

(72) Inventor: Bradley Hoppe, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 459 days.

(21) Appl. No.: 18/542,205

(22) Filed: Dec. 15, 2023

(65) Prior Publication Data

US 2024/0286711 A1 Aug. 29, 2024

Related U.S. Application Data

(60) Provisional application No. 63/448,407, filed on Feb. 27, 2023.

(51) Int. Cl.
*B62M 27/02* (2006.01)

(52) U.S. Cl.
CPC ....... *B62M 27/02* (2013.01); *B62M 2027/028* (2013.01)

(58) Field of Classification Search
CPC ........................ B62M 2027/028; B62M 27/02
See application file for complete search history.

(56) References Cited

U.S. PATENT DOCUMENTS 3,762,736 A 10/1973 Johnson et al.
3,781,038 A 12/1973 Bachel et al.
5,421,611 A * 6/1995 Peterson .................. B60S 9/04 180/184
5,599,002 A 2/1997 Knutson
5,853,187 A 12/1998 Maier
6,904,990 B2 * 6/2005 Etou ..................... B62M 27/02 180/312
7,040,645 B1 5/2006 Borneman et al.
8,695,744 B1 * 4/2014 Bedard ................. B62M 27/02 180/9.1

(Continued)

FOREIGN PATENT DOCUMENTS

CA 3103012 A1 * 6/2021 ............. B62J 50/22

OTHER PUBLICATIONS

Canadian Office Action; CA Application No. 3,225,518; Canadian Intellectual Property Office; Nov. 14, 2025.

(Continued)

*Primary Examiner* — Jason S Morrow
(74) *Attorney, Agent, or Firm* — Billion & Armitage

(57) ABSTRACT

A snowmobile bumper system includes a lift bumper and a tow bumper. The lift bumper includes first and second side lift members with a lift handle extending therebetween. The first side lift member is coupled to a first side panel of a drive tunnel. The second side lift member is coupled to a second side panel of the drive tunnel. The lift handle is disposed aft of and above the drive tunnel. The tow bumper includes first and second side tow members with a cross member extending therebetween. The first side tow member is coupled to the first side panel of the drive tunnel. The second side tow member is coupled to the second side panel of the drive tunnel. The tow bumper is positioned below the lift bumper. A towing assembly is coupled to the cross member of the tow bumper.

20 Claims, 10 Drawing Sheets

(56) References Cited

U.S. PATENT DOCUMENTS

| | | | | |
|---|---|---|---|---|
| 9,828,065 | B2 * | 11/2017 | Pard | B62D 55/244 |
| 10,507,777 | B1 * | 12/2019 | Fraker | B62J 50/10 |
| 11,110,994 | B2 | 9/2021 | Hedlund et al. | |
| 11,701,936 | B1 * | 7/2023 | Dormoy | B62D 55/1083 280/124.121 |
| 12,162,529 | B2 * | 12/2024 | Olin | B62K 21/22 |
| D1,057,613 | S * | 1/2025 | Dong | D12/162 |
| 12,434,783 | B2 * | 10/2025 | Jorgenson | B62J 1/08 |
| 12,467,426 | B2 * | 11/2025 | Vigen | B62M 27/02 |
| 12,589,832 | B2 * | 3/2026 | Martel | B62M 27/02 |
| 2004/0021295 | A1 | 2/2004 | Westerdale | |
| 2018/0237106 | A1 | 8/2018 | Hedlund et al. | |
| 2019/0359159 | A1 | 11/2019 | Fraker | |
| 2021/0362807 | A1 | 11/2021 | Hedlund et al. | |
| 2023/0257049 | A1 * | 8/2023 | Vigen | B62M 27/02 296/1.07 |
| 2023/0312037 | A1 * | 10/2023 | Mercure | B62K 19/18 180/190 |
| 2024/0124096 | A1 * | 4/2024 | Crosby | B62M 27/02 |
| 2024/0400157 | A1 * | 12/2024 | Vezina | B62D 55/07 |
| 2025/0065982 | A1 * | 2/2025 | Vezina | B62M 9/08 |
| 2025/0074123 | A1 * | 3/2025 | Johnson | B62M 27/02 |
| 2025/0115331 | A1 * | 4/2025 | Delor | B62M 27/02 |

OTHER PUBLICATIONS

Arctic Cat; 8-Pocket Rear Bumper Pintle Hitch Kit; https://www.countrycat.com/arctic-cat-6639-911-8-pocket-rear-bumper-pintle-hitch-kit-2013-2024-m-xf-zr-137-146-inch; Unknown Date.

Arctic Cat; Rear Receiver Bumper Kit; https://thomassnosports.com/arctic-cat-rear-reciever-bumper-kit-5639-339-2009-10-bearcat-xt.html; Unknown Date.

In Depth Outdoors; Snowmobile Tow Hitch; https://www.in-depthoutdoors.com/community/forums/topic/atv_1300816/; Unknown Date.

ITEK Industries; Sleigh Hitch; https://www.itekindustries.ca/us/bumper/2744-sleigh-hitch-black-used-part-new-part.html; Unknown Date.

Polaris; Snowmobile Receiver Hitch; https://www.polaris.com/en-us/shop/snowmobiles/accessories/towables-utility/2878344/; Unknown Date.

Totall Yamaha; https://ty4stroke.com/threads/tow-hitch.16629/; Sep. 2005.

* cited by examiner 200
206
208c
210c
210d
216
214
208a
220a
202c
220b
204
202a
210b
208b
210a
210
218a
208
202
212a
218b
212b
202b

BUMPER SYSTEMS FOR SNOWMOBILES

CROSS-REFERENCE TO RELATED APPLICATIONS

The present application claims the benefit of U.S. Provisional Application No. 63/448,407, filed Feb. 27, 2023 the entire contents of which is hereby incorporated by reference.

TECHNICAL FIELD OF THE DISCLOSURE

The present disclosure relates, in general, to bumper systems for use on land vehicles and, in particular, to bumper systems for use on snowmobiles including a tow bumper disposed below a lift bumper with the tow bumper including a towing assembly that is positioned aft of the lift bumper, a drive tunnel and a snow flap.

BACKGROUND

Snowmobiles are popular land vehicles used for transportation and recreation in cold and snowy conditions. Certain snowmobiles are designed for specific applications such as trail, utility, mountain, race and crossover, to name a few. Snowmobiles typically include a chassis that supports various components of the snowmobile such as an engine, a transmission and a ground-engaging endless drive track disposed in a longitudinally extending drive tunnel. The engine and transmission power the drive track to enable ground propulsion for the vehicle. A rider controls the operation of the snowmobile using a steering system including a handlebar assembly that is operatively linked to a pair ski assemblies that provides flotation for the front of the snowmobile over the snow.

Some snowmobiles include a rear bumper formed from round tubular metal that is designed to allow a person to lift the rear end of the snowmobile in the event the snowmobile becomes stuck or needs to be repositioned when it is not moving. It has been found, however, that when towing capability is desired, such round tubular lift bumpers lack the strength and the attachment points for a towing assembly, and must therefore be replaced with a more robust square tubular metal tow bumper that is thicker and includes a welded bracket for attaching the towing assembly. For certain snowmobiles, however, removing the round tubular lift bumper and installing a square tubular tow bumper in its place is a complex task requiring disconnecting the round tubular lift bumper from numerous snowmobile components such as the taillight housing, the snow flap and the rear kick up components.

SUMMARY

In a first aspect, the present disclosure is directed to a bumper system for a snowmobile having a drive tunnel including first and second side panels. The bumper system includes a lift bumper and a tow bumper. The lift bumper has first and second side lift members with a lift handle extending therebetween. The first side lift member is coupled to the first side panel of the drive tunnel. The second side lift member is coupled to the second side panel of the drive tunnel. The lift handle is disposed aft of and above the drive tunnel. The tow bumper has first and second side tow members with a cross member extending therebetween. The first side tow member is coupled to the first side panel of the drive tunnel. The second side tow member is coupled to the second side panel of the drive tunnel. The tow bumper is positioned below the lift bumper. A towing assembly is coupled to the cross member of the tow bumper.

In certain embodiments, the lift bumper may include one or more round tubular members that form the first and second side lift members and the lift handle. In some embodiments, each of the first and second side lift members may include two substantially straight tubular members having a bend therebetween. In certain embodiments, the first and second side lift members may be respectively positioned outboard of the first and second side panels of the drive tunnel. In some embodiments, the tow bumper may include one or more square tubular members that form the first and second side tow members and the cross member. In certain embodiments, the first and second side tow members may be respectively positioned outboard of the first and second side panels of the drive tunnel.

In some embodiments, first and second support brackets may respectively couple the first and second side tow members to the first and second side panels of the drive tunnel. In certain embodiments, first and second forward support brackets may respectively couple the first and second side tow members to the first and second side panels of the drive tunnel and first and second aft support brackets may respectively couple the first and second side tow members to the first and second side panels of the drive tunnel. In such embodiments, the first aft support bracket may be selectively couplable to the first side tow member at a plurality of locations and the second aft support bracket may be selectively couplable to the second side tow member at a plurality of locations. In some embodiments, the towing assembly may include a rotatable receiver. In other embodiments, the towing assembly may include a hook and latch receiver.

In a second aspect, the present disclosure is directed to a snowmobile that includes a chassis, a drive tunnel coupled to the chassis and including first and second side panels, and a powertrain coupled to the chassis. A drive track is disposed at least partially below the drive tunnel. The drive track receives rotational energy from the powertrain such that the drive track is configured to provide ground propulsion for the snowmobile. A lift bumper has first and second side lift members with a lift handle extending therebetween. The first side lift member is coupled to the first side panel of the drive tunnel. The second side lift member is coupled to the second side panel of the drive tunnel. The lift handle is disposed aft of and above the drive tunnel. A tow bumper has first and second side tow members with a cross member extending therebetween. The first side tow member is coupled to the first side panel of the drive tunnel. The second side tow member is coupled to the second side panel of the drive tunnel. The tow bumper is positioned below the lift bumper. A towing assembly is coupled to the cross member of the tow bumper.

In certain embodiments, the snowmobile may include a snow flap that is coupled to and extends downwardly from the lift bumper. In such embodiments, the towing assembly may be positioned aft of the snow flap. Also, in such embodiments, the towing assembly may be positioned below at least a portion of the snow flap. In some embodiments, the towing assembly may be positioned aft of the lift bumper. In certain embodiments, the towing assembly may be positioned below of the lift bumper.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
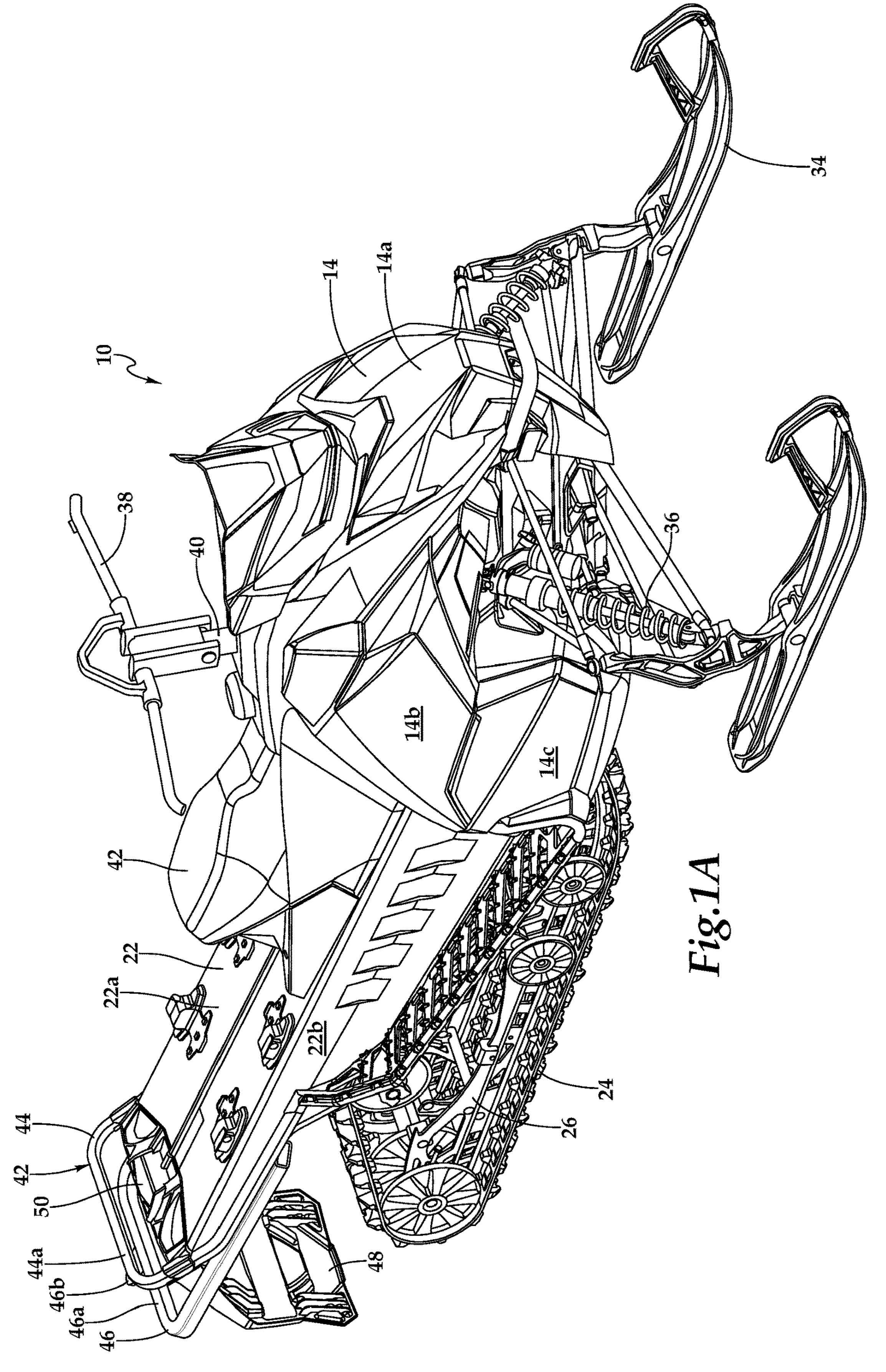
FIGS. 1A-1C are schematic illustrations of a snowmobile having a bumper system that includes a lift bumper and a tow bumper in accordance with embodiments of the present disclosure.
Figure 1B:
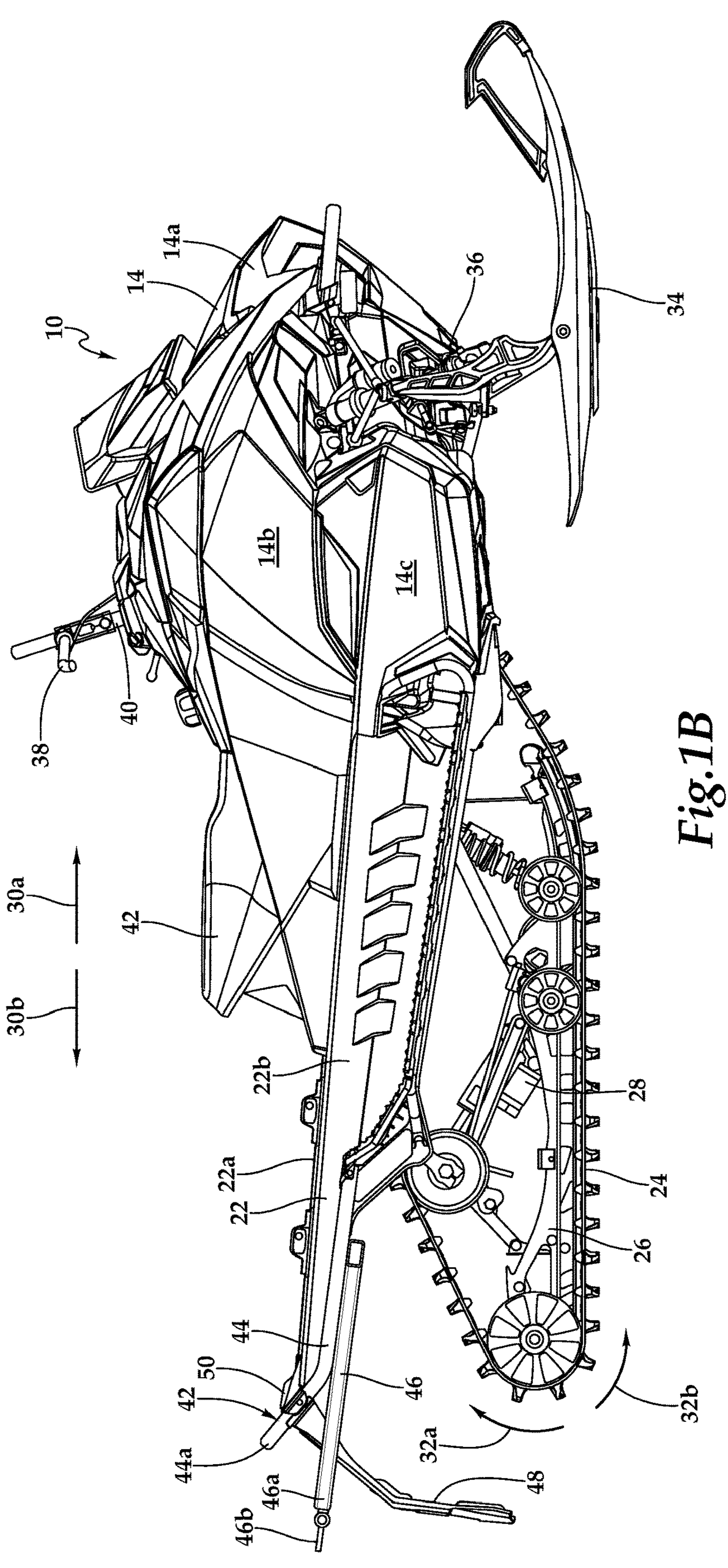
Figure 1C:
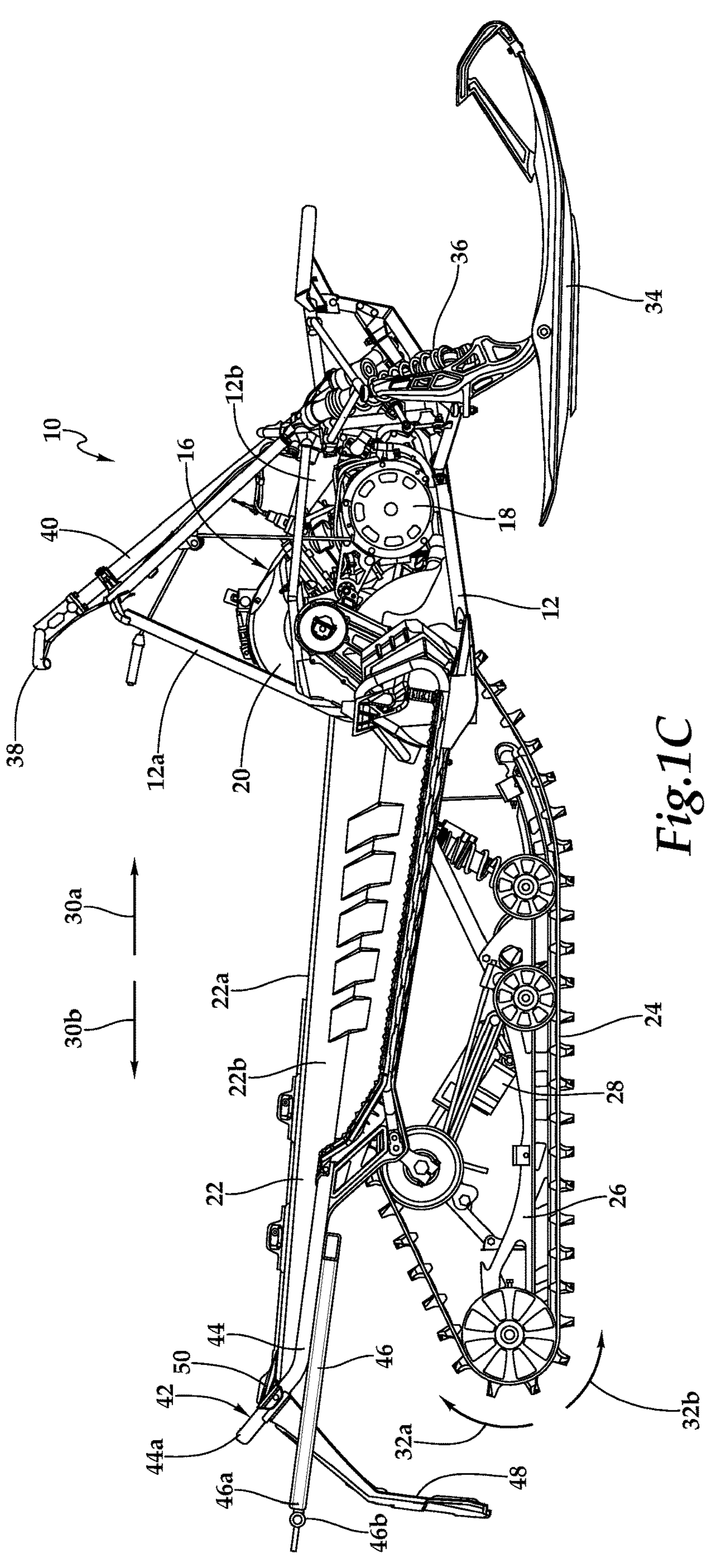

Referring to FIGS. 1A-1C in the drawings, a land vehicle depicted as a snowmobile is schematically illustrated and generally designated 10. Structural support for snowmobile 10 is provided by chassis 12, on or around which the various components of snowmobile 10 are assembled. Chassis 12 includes a forward frame assembly 12*a* that is formed from interconnected tubular members such as round and hollow tubular members comprised of a metal, a metal alloy, a polymeric material and/or fiber reinforced polymer composite that are coupled together by welds, bolts, pins or other suitable fastening means. One or more body panels depicted as shrouds 14 cover and protect the various components of snowmobile 10 including parts of chassis 12. For example, a front shroud 14*a*, an upper right side shroud 14*b*, a lower right side shroud 14*c* and similar left side shrouds shield underlying componentry from snow and shield the rider of snowmobile 10 from oncoming terrain and frigid air during operation. Snowmobile 10 may include any number of shrouds 14 to provide the shielding function. It should be understood by those having ordinary skill in the art that the right side and the left side of snowmobile 10 will be with reference to a rider of snowmobile 10 with the right side of snowmobile 10 corresponding to the right side of the rider and the left side of snowmobile 10 corresponding to the left side of the rider.

Shrouds 14 have been removed from snowmobile 10 in FIG. 1C to reveal the underlying components such as chassis 12. Snowmobile 10 has a powertrain 16 that includes an engine 18 and a transmission 20 both of which are coupled to chassis 12. Engine 18 resides in an engine bay 12*b* formed within forward frame assembly 12*a* of chassis 12. Engine 18 may be any type of engine such as a four-stroke engine, a two-stroke engine, an electric motor or other prime mover. In the illustrated embodiment, engine 18 is an internal combustion engine such as a naturally aspirated internal combustion engine, a supercharged internal combustion engine or a turbo charged internal combustion engine. Transmission 20 may be a continuously variable transmission, an electrically variable transmission or other suitable transmission type for varying the ratio of the engine output speed to the drive track input speed.

Cassis 12 includes a longitudinally extending drive tunnel 22 that is coupled to forward frame 12*a*. Drive tunnel 22 includes a top panel 22*a*, a right side panel 22*b* and a similar left side panel. Drive tunnel 22 may be formed from sheet metal, metal alloy, fiber reinforced polymer or other suitable material or materials. A drive track 24 is at least partially disposed within and/or below drive tunnel 22 and is in contact with the ground to provide ground propulsion for snowmobile 10. In alternative embodiments, drive track 24 may instead be one or more wheels. Rotational energy is provided to drive track 24 from engine 18 via transmission 20. Drive track 24 is supported by a track frame 26 having an internal suspension 28. Track frame 26 may be coupled to forward frame assembly 12*a* via a swing arm having a coil spring, a rigid strut, a torsion spring, an elastomeric member or any other suitable coupling configuration. Drive track 24 rotates around track frame 26 to propel snowmobile 10 in either the forward direction, as indicated by arrow 30*a*, or the backwards direction, as indicated by arrow 30*b*. As illustrated, when viewed from the right side of the vehicle, when drive track 24 rotates around track frame 26 in the clockwise direction, as indicated by arrow 32*a*, drive track 24 propels snowmobile 10 in the forward direction 30*a*. When drive track 24 rotates around track frame 26 in the counterclockwise direction, as indicated by arrow 32*b*, drive track 24 propels snowmobile 10 in the backward direction

30*b*. The forward and backward directions also represent the longitudinal direction of snowmobile 10 with the lateral direction of snowmobile 10 being normal thereto and represented by the leftward and rightward directions. The backward direction may also be referred to herein as the aftward direction.

Snowmobile 10 includes a pair of skis 34 and a front suspension assembly 36 that provide front end support for snowmobile 10. Skis 34 are interconnected to a handlebar assembly 38 by a steering column 40 enabling the rider to steer snowmobile 10 in the leftward and rightward directions. For example, when handlebar assembly 38 is rotated, skis 34 responsively pivot to turn snowmobile 10. The rider controls snowmobile 10 from a seat 42 that is position above tunnel 22 and aft of handlebar assembly 38 and forward frame 12*a*. Snowmobile 10 has a bumper system 42 that includes a lift bumper 44 and a tow bumper 46. Lift bumper 44 is coupled to drive tunnel 22 and has a lift handle 44*a* that is disposed aft of and above the drive tunnel 22. Lift handle 44*a* enables a person to lift the rear end of snowmobile 10 in the event snowmobile 10 becomes stuck or needs to be repositioned when it is not moving. Tow bumper 46 is coupled to drive tunnel 22 below lift bumper 44. Tow bumper 46 includes an aftwardly disposed cross member 46*a* including a towing assembly 46*b* that is positioned aft of drive tunnel 22, lift bumper 44 and a snow flap 48 that deflects snow emitted by drive track 24. In the illustrated embodiment, snow flat 48 is coupled to lift bumper 44. In other embodiments, a snow flat may be coupled directly to drive tunnel 22. A taillight housing 50 is coupled to lift bumper 44 and houses a taillight of snowmobile 10.

It should be appreciated that snowmobile 10 is merely illustrative of a variety of vehicles that can implement the embodiments disclosed herein. Indeed, bumper system 42 may be implemented on any ground-based vehicle. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that bumper system 42 can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 2A:
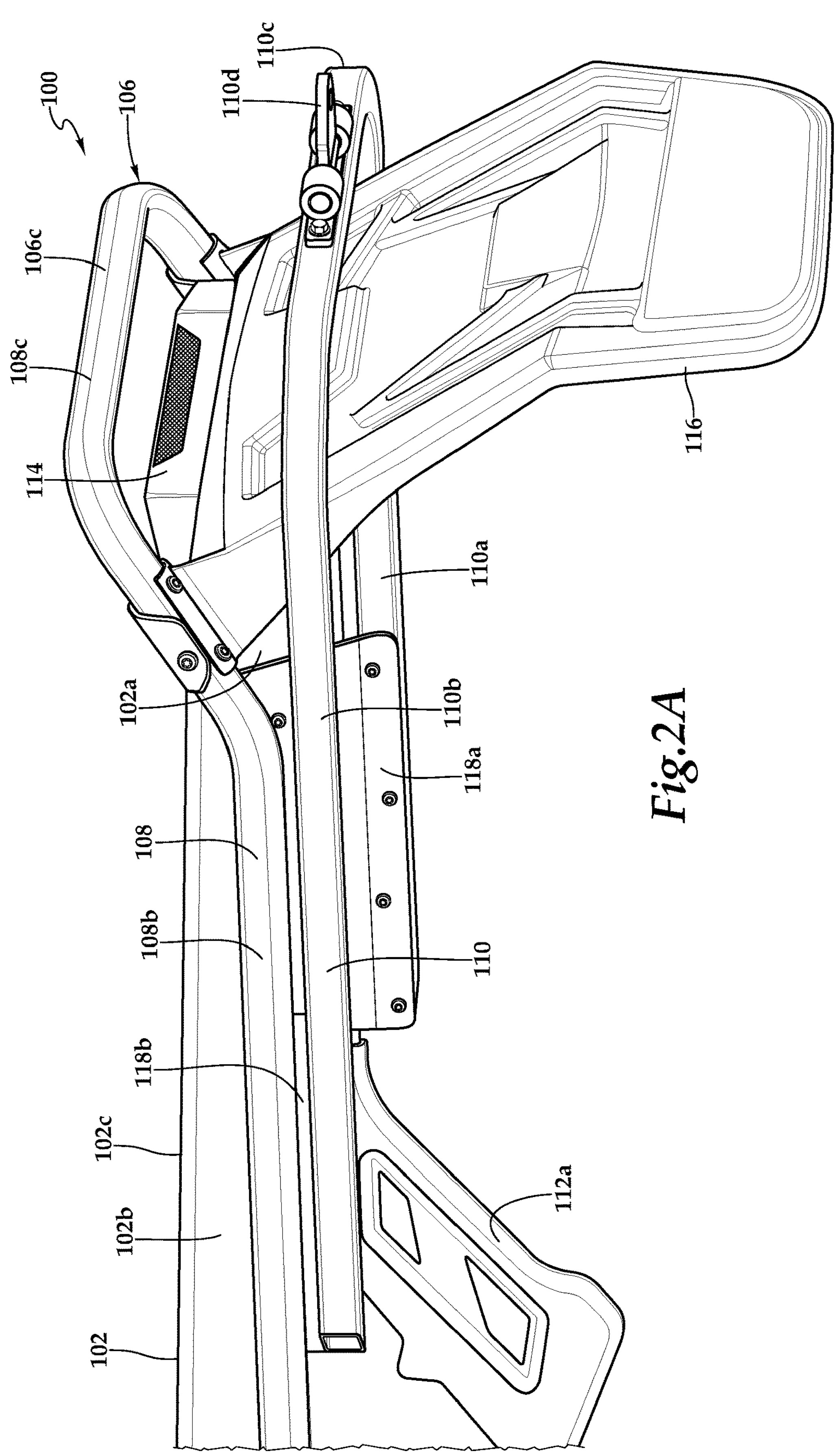
FIG. 2A is a rear and left side isometric view of a bumper system for a snowmobile that includes a lift bumper and a tow bumper in accordance with embodiments of the present disclosure.
Figure 2B:
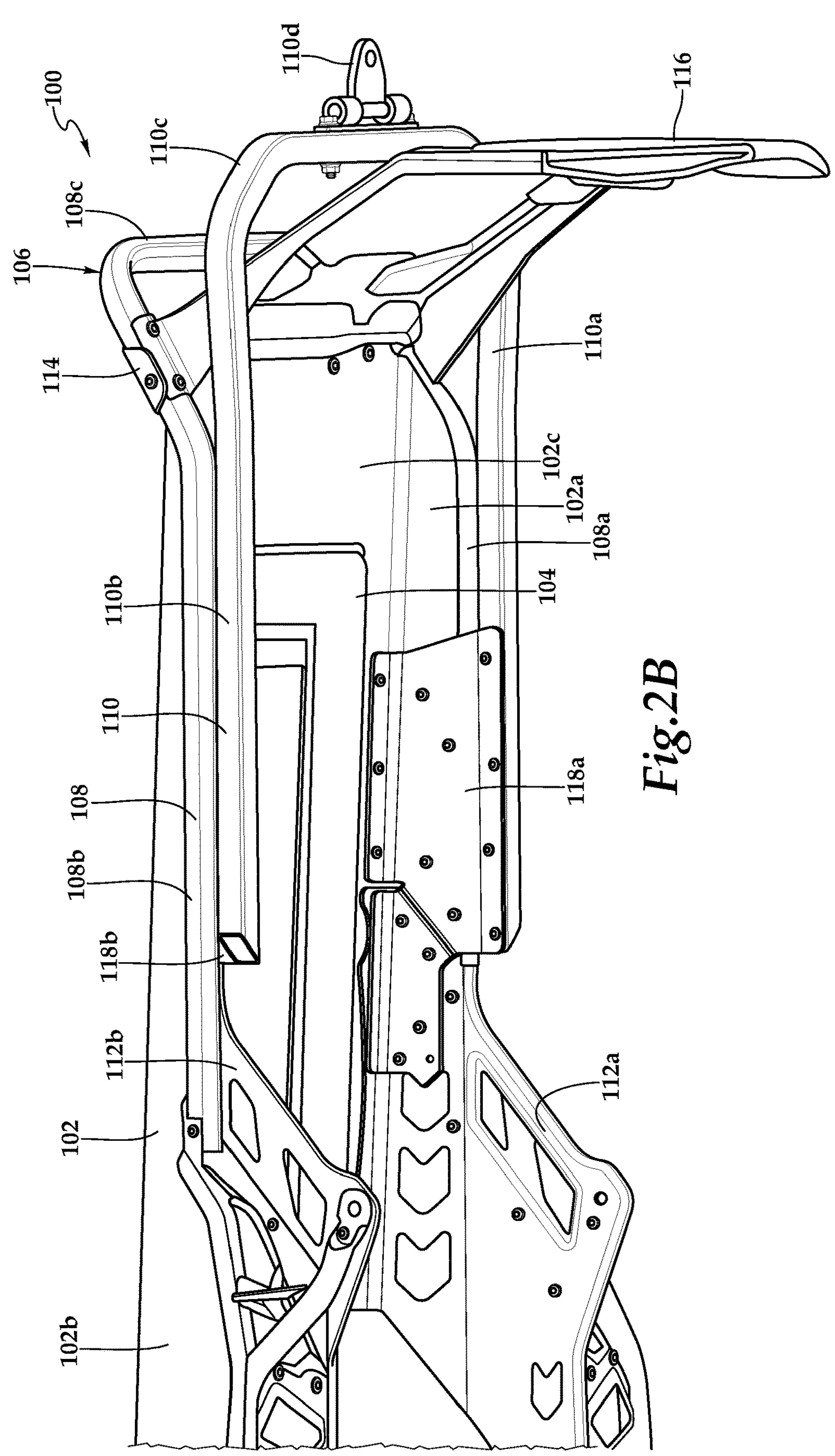
FIG. 2B is a left side view taken from below of a bumper system for a snowmobile that includes a lift bumper and a tow bumper in accordance with embodiments of the present disclosure.

Referring now to FIGS. 2A-2B of the drawings, therein is depicted an aft portion of a snowmobile that is generally designated 100 and that is representative of snowmobile 10 discussed herein. Snowmobile 100 includes a drive tunnel 102 that has a right side panel 102*a*, left side panel 102*b* and a top panel 102*c*. In the illustrated embodiment, a portion of the engine cooling system, depicted as heat exchanger 104, is disposed on the underside or lower surface of top panel 102*a*. Heat exchanger 104 receives engine cooling fluid that circulates therethrough and is mainly cooled due to the snow present in drive tunnel 102 during operations. As drive tunnel 102 is a structural constituent of snowmobile 100, various other components of snowmobile 100 are attached thereto such as a bumper system 106 that includes a lift bumper 108 and a tow bumper 110. In the illustrated embodiment, lift bumper 108 is formed from one or more sections of round tubular metal. Lift bumper 108 includes a right side lift member 108*a*, a left side lift member 108*b* and a lift handle 108*c*. In the illustrated embodiment, right side lift member 108*a* and left side lift member 108*b* each have a bend between a forward portion and an aft portion. The forward portions extend aftwardly and upwardly at a first slope and in a direction substantially parallel with the respective right and left side panels 102*a*, 102*b* of drive tunnel 102. The aft portions extend aftwardly and upwardly at a second slope from the forward portions such that the bends are considered to be vertical bends. In other embodiments, the bends could alternatively or additionally include lateral changes of direction.

In the illustrated embodiment, right side lift member 108*a* is positioned outboard of right side panel 102*a* of drive tunnel 102 and is coupled thereto via a support bracket 112*a* by one or more fasteners such as rivets, screws, bolts or other mechanical fastening means. Support bracket 112*a* is coupled to an interior surface of right side panel 102*a* by a plurality of fasteners. In addition, the aft end of right side lift member 108*a* is coupled to an aft portion of drive tunnel 102 via a taillight housing 114 by one or more fasteners. Likewise, left side lift member 108*b* is positioned outboard of left side panel 102*b* of drive tunnel 102 and is coupled thereto via a support bracket 112*b* by one or more fasteners. Support bracket 112*b* is coupled to an interior surface of left side panel 102*b* by a plurality of fasteners. In addition, the aft end of left side lift member 108*b* is coupled to an aft portion of drive tunnel 102 via taillight housing 114 by one or more fasteners. A snow flap 116 that deflects snow emitted by the drive track of snowmobile 100 is coupled to and extends downwardly from the undersides of right side lift member 108*a* and left side lift member 108*b* by one or more fasteners. In addition, snow flap 116 may be coupled to an underside of taillight housing 114 and/or an aft portion of drive tunnel 102 for additional support.

Lift handle 108*c* extends between the aft end of right side lift member 108*a* and the aft end of left side lift member 108*b* such that lift handle 108*c* is positioned aft of and above drive tunnel 102. As discussed herein, lift handle 108*c* enables a person to lift the rear end of snowmobile 100 in the event snowmobile 100 becomes stuck or needs to be repositioned when it is not moving. As lift bumper 108 is constructed from relatively light weight round tubular metal, lift bumper 108 lacks suitable strength when towing capability is desired. In addition, lift bumper 108 lacks attachment points for securing a towing assembly thereto. As lift bumper 108 is coupled to numerous snowmobile components including support bracket 112*a*, 112*b*, taillight housing 114 and snow flap 116, it is not desirable to replace lift bumper 108 with a more robust tow bumper when towing capability is desired. Instead, in the present embodiment, bumper system 106 includes an independent tow bumper 110 that is positioned below lift bumper 108. In the illustrated embodiment, tow bumper 110 is formed from one or more sections of square tubular metal having suitable strength to provide towing capabilities for snowmobile 100. Tow bumper 110 includes a right side tow member 110*a*, a left side tow member 110*b* and a cross member 110*c*. Right side tow member 110*a* and left side tow member 110*b* may be straight members or may have lateral or vertical bends. In the illustrated embodiment, cross member 110*c* includes right and left side angled portions that extend forward and outboard from a straight central section positioned therebetween. Cross member 110*c* includes a towing assembly 110*d*, depicted as a rotatable receiver, which is coupled to the central section thereof via a pair of bolts. As illustrated, towing assembly 110*d* is positioned aft of drive tunnel 102, aft of lift bumper 108, aft of snow flap 116, below lift bumper 108, below lift handle 108*c* and below at least a portion of snow flap 116.

In the illustrated embodiment, right side tow member 110*a* is positioned below right side lift member 108*a* and outboard of right side panel 102*a* of drive tunnel 102. Right side tow member 110*a* is coupled to drive tunnel 102 via a support bracket 118*a* by a plurality of fasteners including fasteners that couple with right side panel 102*a*, top panel 102*c* and/or support bracket 112*a*. In the illustrated embodiment, support bracket 118*a* is coupled to an interior portion of drive tunnel 102. In other embodiments, a support bracket could be coupled to an exterior portion of drive tunnel 102. Likewise, left side tow member 110*b* is positioned below left side lift member 108*b* and outboard of left side panel 102*b* of drive tunnel 102. Left side tow member 110*b* is coupled to drive tunnel 102 via a support bracket 118*b* by a plurality of fasteners including fasteners that couple with left side panel 102*b*, top panel 102*c* and/or support bracket 112*b*. In the illustrated embodiment, support bracket 118*b* is coupled to an interior portion of drive tunnel 102. In other embodiments, a support bracket could be coupled to an exterior portion of drive tunnel 102. Cross member 110*c* extends between the aft end of right side tow member 110*a* and the aft end of left side tow member 110*b* and is configured to receive towing assembly 110*d*.

It should be understood by those having ordinary skill in the art that a tow bumper of the present disclosure, such as tow bumper 110, could be installed on a snowmobile that does not include a lift bumper. In addition, it should be understood by those having ordinary skill in the art that a tow bumper of the present disclosure, such as tow bumper 110, may be an aftermarket accessory added to a snowmobile that either came equipped with a lift bumper or did not include a lift bumper. In either case, the aftermarket tow bumper accessory may be provided as a kit including, for example, one or more tubular members, a towing assembly, the fasteners needed for assembling the tow bumper, the support brackets and fasteners need to attach the assembled tow bumper to the snowmobile as well as instructions and tools for accomplishing the assembly and installation.

Figure 3:
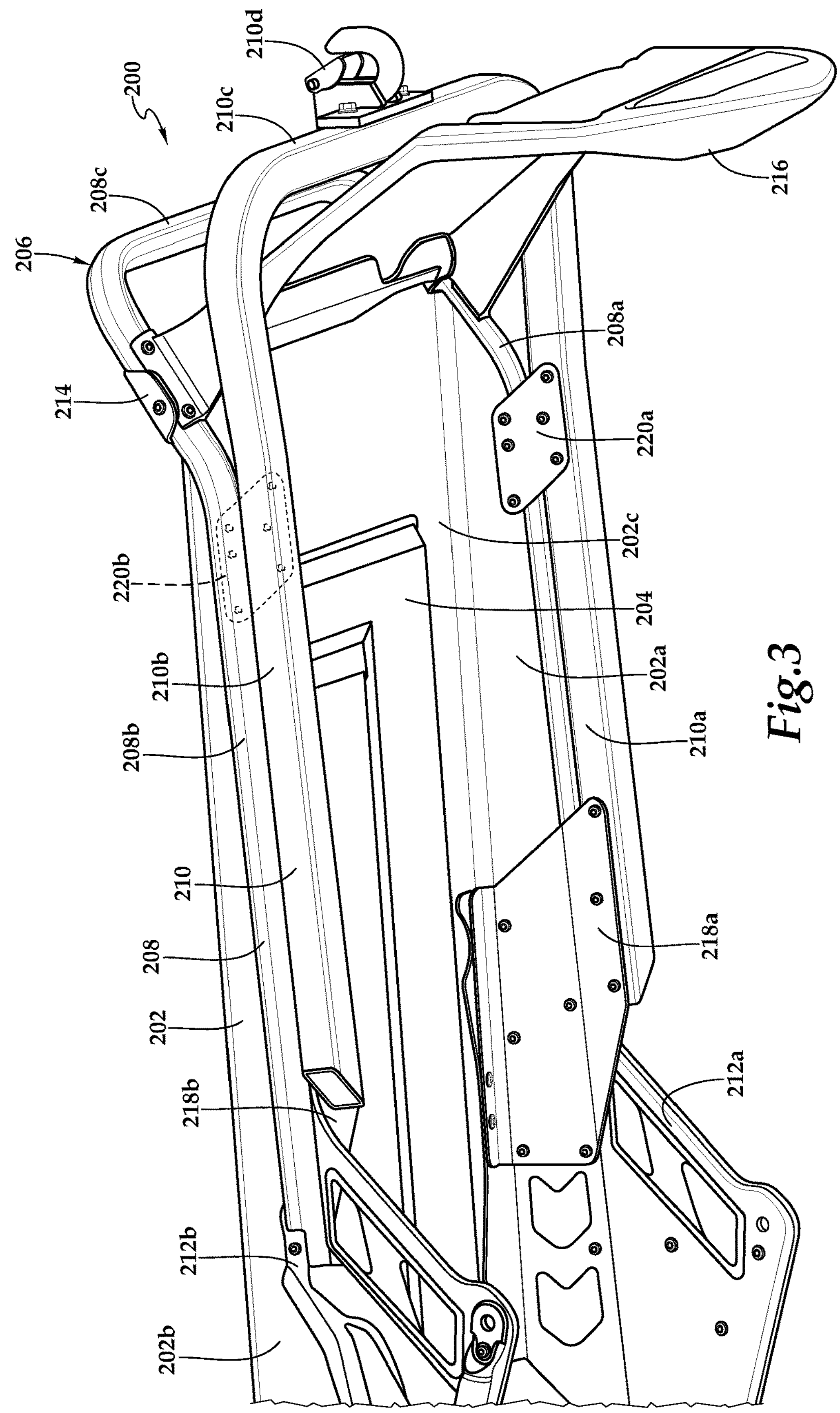
FIG. 3 is a rear and left side view taken from below of a bumper system for a snowmobile that includes a lift bumper and a tow bumper in accordance with embodiments of the present disclosure.

Referring now to FIG. 3 of the drawings, therein is depicted an aft portion of a snowmobile that is generally designated 200 and that is representative of snowmobile 10 discussed herein. Snowmobile 200 includes a drive tunnel 202 that has a right side panel 202*a*, left side panel 202*b* and a top panel 202*c*. In the illustrated embodiment, a portion of the engine cooling system, depicted as heat exchanger 204, is disposed on the underside or lower surface of top panel 202*a*. As drive tunnel 202 is a structural constituent of snowmobile 200, various other components of snowmobile 200 are attached thereto such as a bumper system 206 that includes a lift bumper 208 and a tow bumper 210. In the illustrated embodiment, lift bumper 208 is formed from one or more sections of round tubular metal. Lift bumper 208 includes a right side lift member 208*a*, a left side lift member 208*b* and a lift handle 208*c*. Right side lift member 208*a* and left side lift member 208*b* each have a forward member and an aft member having a bend therebetween.

In the illustrated embodiment, right side lift member 208*a* is positioned outboard of right side panel 202*a* of drive tunnel 202 and is coupled thereto via a support bracket 212*a* by one or more fasteners such as rivets, screws, bolts or other mechanical fastening means. Support bracket 212*a* is coupled to an interior surface of right side panel 202*a* by one or more fasteners. In addition, the aft end of right side lift member 208*a* is coupled to an aft portion of drive tunnel 202 via a taillight housing 214 by one or more fasteners. Likewise, left side lift member 208*b* is positioned outboard of left side panel 202*b* of drive tunnel 202 and is coupled thereto via a support bracket 212*b* by one or more fasteners. Support bracket 212*b* is coupled to an interior surface of left side panel 202*b* by one or more fasteners. In addition, the aft end of left side lift member 208*b* is coupled to an aft portion of drive tunnel 202 via taillight housing 214 by one or more fasteners. A snow flap 216 that deflects snow emitted by the drive track of snowmobile 200 is coupled to and extends downwardly from the undersides of right side lift member 208*a* and left side lift member 208*b* by one or more fasteners. In addition, snow flap 216 may be coupled to an underside of taillight housing 214 and/or an aft portion of drive tunnel 202 for additional support.

Lift handle 208*c* extends between the aft end of right side lift member 208*a* and the aft end of left side lift member 208*b* such that lift handle 208*c* is positioned aft of and above drive tunnel 202. As discussed herein, lift handle 208*c* enables a person to lift the rear end of snowmobile 200 in the event snowmobile 200 becomes stuck or needs to be repositioned when it is not moving. As lift bumper 208 is constructed from relatively light weight round tubular metal, lift bumper 208 lacks suitable strength when towing capability is desired. In addition, lift bumper 208 lacks attachment points for securing a towing assembly thereto. As lift bumper 208 is coupled to numerous snowmobile components including support bracket 212*a*, 212*b*, taillight housing 214 and snow flap 216, it is not desirable to replace lift bumper 208 with a more robust tow bumper when towing capability is desired. Instead, in the present embodiment, bumper system 206 includes an independent tow bumper 210 that is positioned below lift bumper 208. In the illustrated embodiment, tow bumper 210 is formed from one or more sections of square tubular metal having suitable strength to provide towing capabilities for snowmobile 200. Tow bumper 210 includes a right side tow member 210*a*, a left side tow member 210*b* and a cross member 210*c*. In the illustrated embodiment, cross member 210*c* includes right and left side curved portions that extend forward and outboard from a straight central section positioned therebetween. Cross member 210*c* includes a towing assembly 210*d*, depicted as a hook and latch receiver, which is coupled to the central section thereof via a pair of bolts. As illustrated, towing assembly 210*d* is positioned aft of drive tunnel 202, aft of lift bumper 208, aft of snow flap 216, below lift bumper 208, below lift handle 208*c* and below at least a portion of snow flap 216.

In the illustrated embodiment, right side tow member 210*a* is positioned below right side lift member 208*a* and outboard of right side panel 202*a* of drive tunnel 202. Right side tow member 210*a* is coupled to drive tunnel 202 via a forward support bracket 218*a* and an aft support bracket 220*a* by a plurality of fasteners including fasteners that couple with right side panel 202*a*, top panel 202*c* and/or support bracket 212*a*. In the illustrated embodiment, support brackets 218*a*, 220*a* are coupled to an interior portion of drive tunnel 202. In other embodiments, support brackets could be coupled to an exterior portion of drive tunnel 202. Likewise, left side tow member 210*b* is positioned below left side lift member 208*b* and outboard of left side panel 202*b* of drive tunnel 202. Left side tow member 210*b* is coupled to drive tunnel 202 via a forward support bracket 218*b* and an aft support bracket 220*b* by a plurality of fasteners including fasteners that couple with left side panel 202*c*, top panel 202*c* and/or support bracket 212*b*. In the illustrated embodiment, support brackets 218*b*, 220*b* are coupled to an interior portion of drive tunnel 202. In other embodiments, support brackets could be coupled to an exterior portion of drive tunnel 202. Cross member 210*c* extends between the aft end of right side tow member 210*a* and the aft end of left side tow member 210*b* and is configured to receive towing assembly 210*d*.

Figure 4:
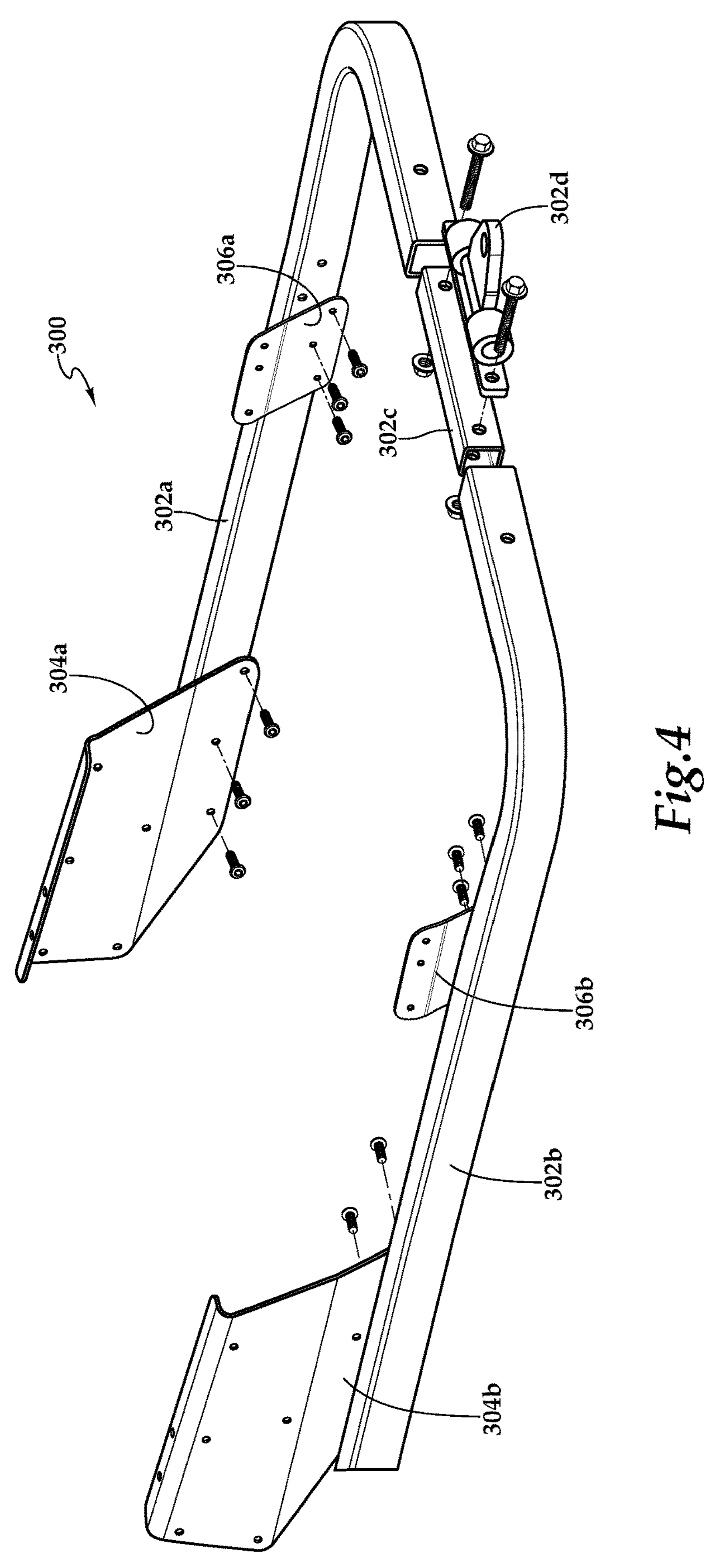
FIG. 4 is an exploded view of a tow bumper for a bumper system of a snowmobile in accordance with embodiments of the present disclosure.

Referring additionally to FIG. 4 of the drawings, therein is depicted a tow bumper 300 that is configured to be installed on a snowmobile such as the snowmobiles discussed herein. Tow bumper 300 is formed from a right bent tubular member 302*a*, a left bent tubular member 302*b* and a union tubular member 302*c*. Right bent tubular member 302*a* includes a right side forward portion and a laterally and inboardly extending aft portion that includes an open end and a pair of bolt apertures. Left bent tubular member 302*b* includes a left side forward portion and a laterally and inboardly extending aft portion that includes an open end and a pair of bolt apertures. Union tubular member 302*c* has a smaller dimension than right bent tubular member 302*a* and left bent tubular member 302*b* such that union tubular member 302*c* can be received within the open ends of right bent tubular member 302*a* and left bent tubular member 302*b*. Union tubular member 302*c* includes two pairs of bolt apertures that are respectively aligned with the bolt apertures of right bent tubular member 302*a* and left bent tubular member 302*b*. In this configuration, the aligned bolt apertures receive a pair of bolts therethrough that couple union tubular member 302*c* within right bent tubular member 302*a* and left bent tubular member 302*b*. In addition, the bolts pass through bolt apertures in a towing assembly 302*d* to secure towing assembly 302*d* to the tubular system. It is noted that right bent tubular member 302*a* includes the right side tow member and a right half of the cross member of the tow bumpers discussed above. Likewise, left bent tubular member 302*b* includes the left side tow member and a left half of the cross member of the tow bumpers discussed above.

In the illustrated embodiment, right bent tubular member 302*a* is coupled to a forward support bracket 304*a* and an aft support bracket 306*a* with a plurality of fasteners. Likewise, left bent tubular member 302*b* is coupled to a forward support bracket 304*b* and an aft support bracket 306*b* with a plurality of fasteners. Forward support brackets 304*a*, 304*b* and aft support brackets 306*a*, 306*b* are used to couple tow bumper 300 to the drive tunnel of a snowmobile, as discussed herein, such that tow bumper 300 is positioned below a lift bumper and towing assembly 302*d* is positioned, for example, aft of the drive tunnel, aft of the lift bumper, aft of the snow flap, below the lift bumper, below the lift handle and below at least a portion of the snow flap.

Figure 5:
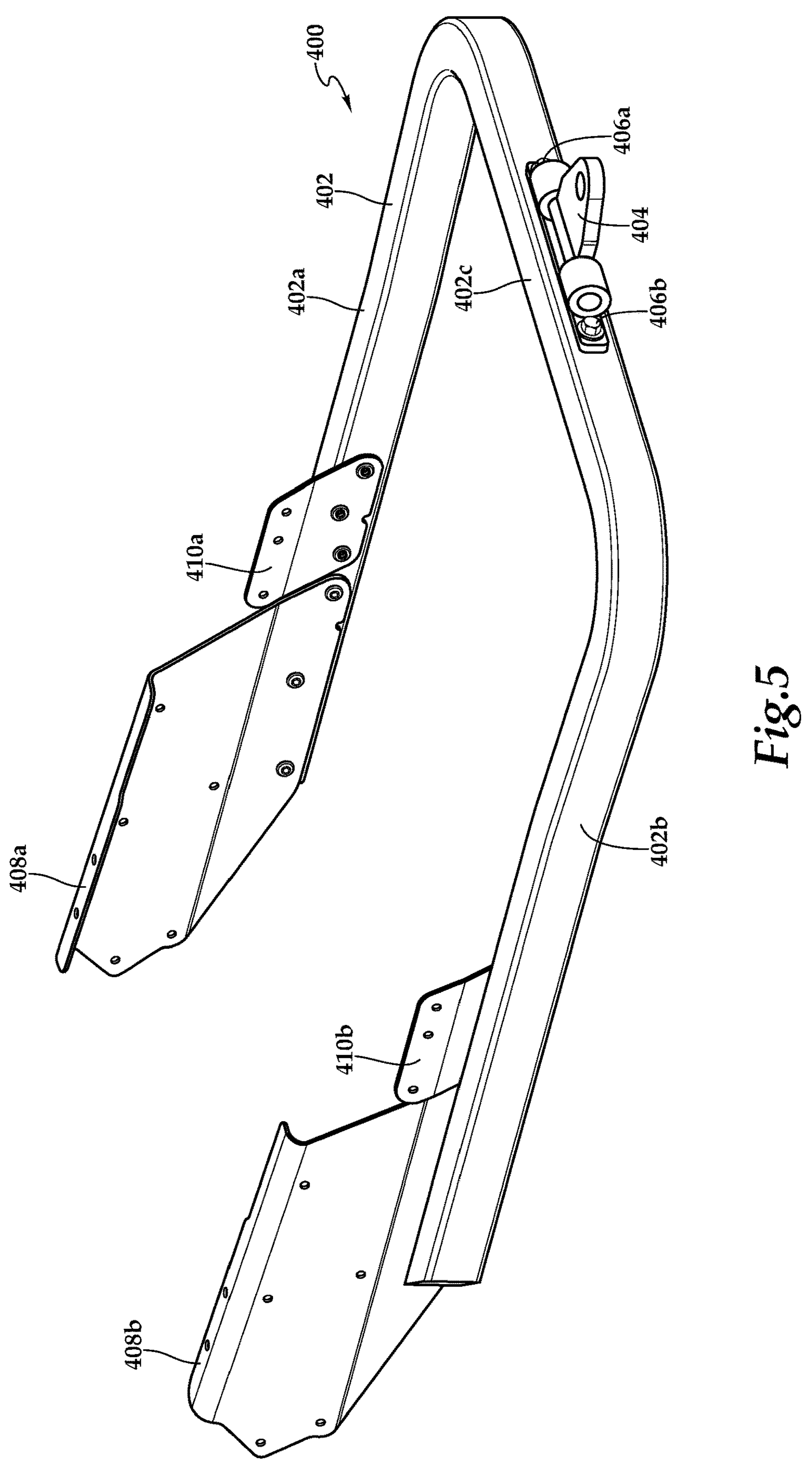
FIG. 5 is an isometric view of a tow bumper for a bumper system of a snowmobile in accordance with embodiments of the present disclosure.

Referring additionally to FIG. 5 of the drawings, therein is depicted a tow bumper 400 that is configured to be installed on a snowmobile, such as the snowmobiles discussed herein. In the illustrated embodiment, tow bumper 400 is formed from a single tubular member 402 that may be bent or otherwise shaped to include a right side tow member 402*a*, a left side tow member 402*b* and a cross member 402*c*. A towing assembly 404, depicted as a rotatable receiver, is coupled to cross member 402*c* with a pair of bolts 406*a*, 406*b* that pass through bolt apertures in towing assembly 404 and cross member 402*c* to secure towing assembly 404 to tubular member 402. Right side tow member 402*a* is coupled to a forward support bracket 408*a* and an aft support bracket 410*a* with a plurality of fasteners. Likewise, left side tow member 402*b* is coupled to a forward support bracket 408*b* and an aft support bracket 410*b* with a plurality of fasteners. Forward support brackets 408*a*, 408*b* and aft support brackets 410*a*, 410*b* are used to couple tow bumper 400 to the drive tunnel of a snowmobile, as discussed herein, such that tow bumper 400 may be positioned, for example, below a lift bumper and towing assembly 404 may be positioned, for example, aft of the drive tunnel, aft of the lift bumper, aft of the snow flap, below the lift bumper, below the lift handle and below at least a portion of the snow flap. In the illustrated embodiments, when forward support bracket 408*a* and aft support bracket 410*a* are coupled to right side tow member 402*a*, forward support bracket 408*a* and aft support bracket 410*a* are substantially adjacent to each other. Likewise, when forward support bracket 408*b* and aft support bracket 410*b* are coupled to left side tow member 402*b*, forward support bracket 408*b* and aft support bracket 410*b* are substantially adjacent to each other.

Figure 6A:
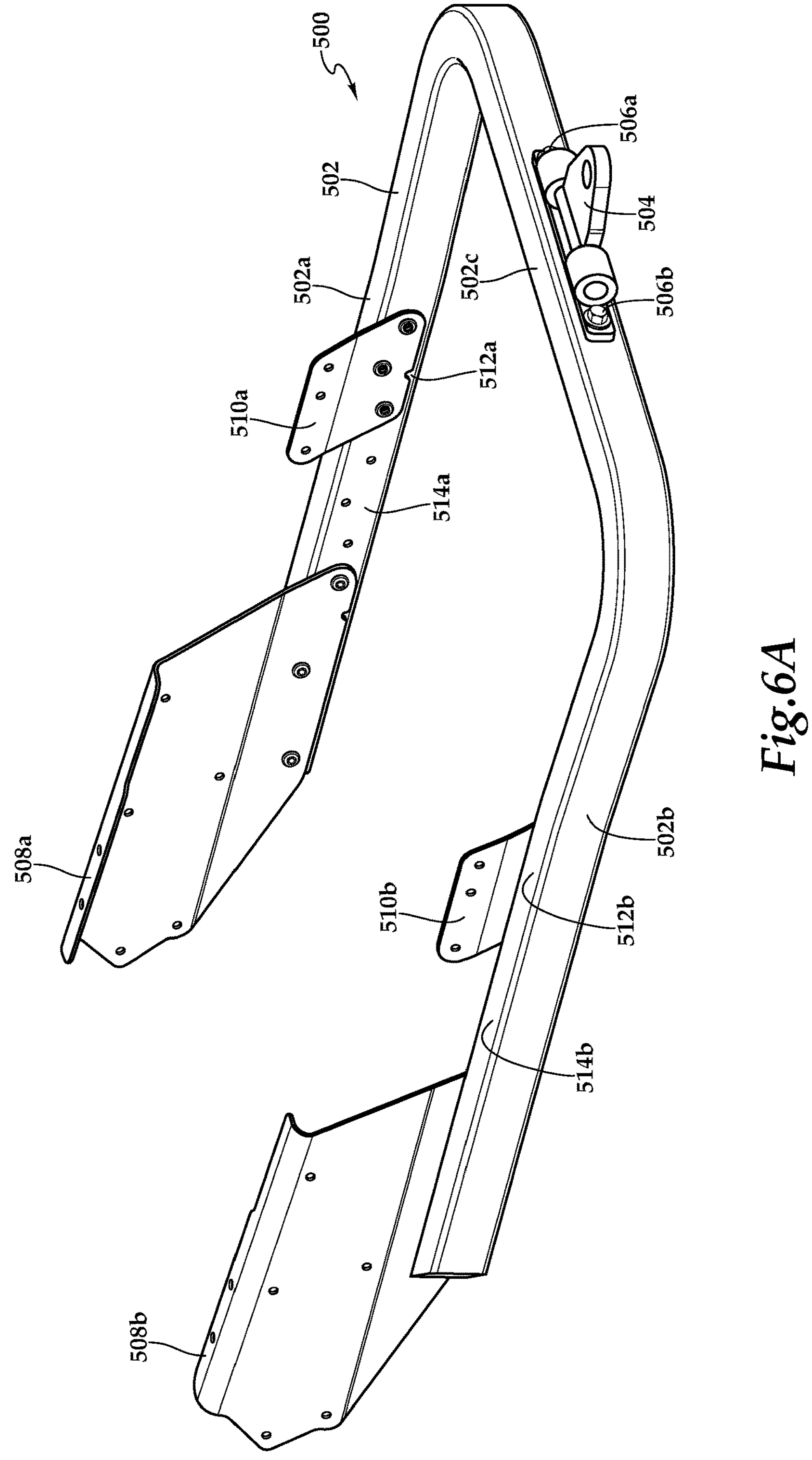
FIG. 6A-6B are isometric views of a tow bumper for a bumper system of a snowmobile in accordance with embodiments of the present disclosure.
Figure 6B:
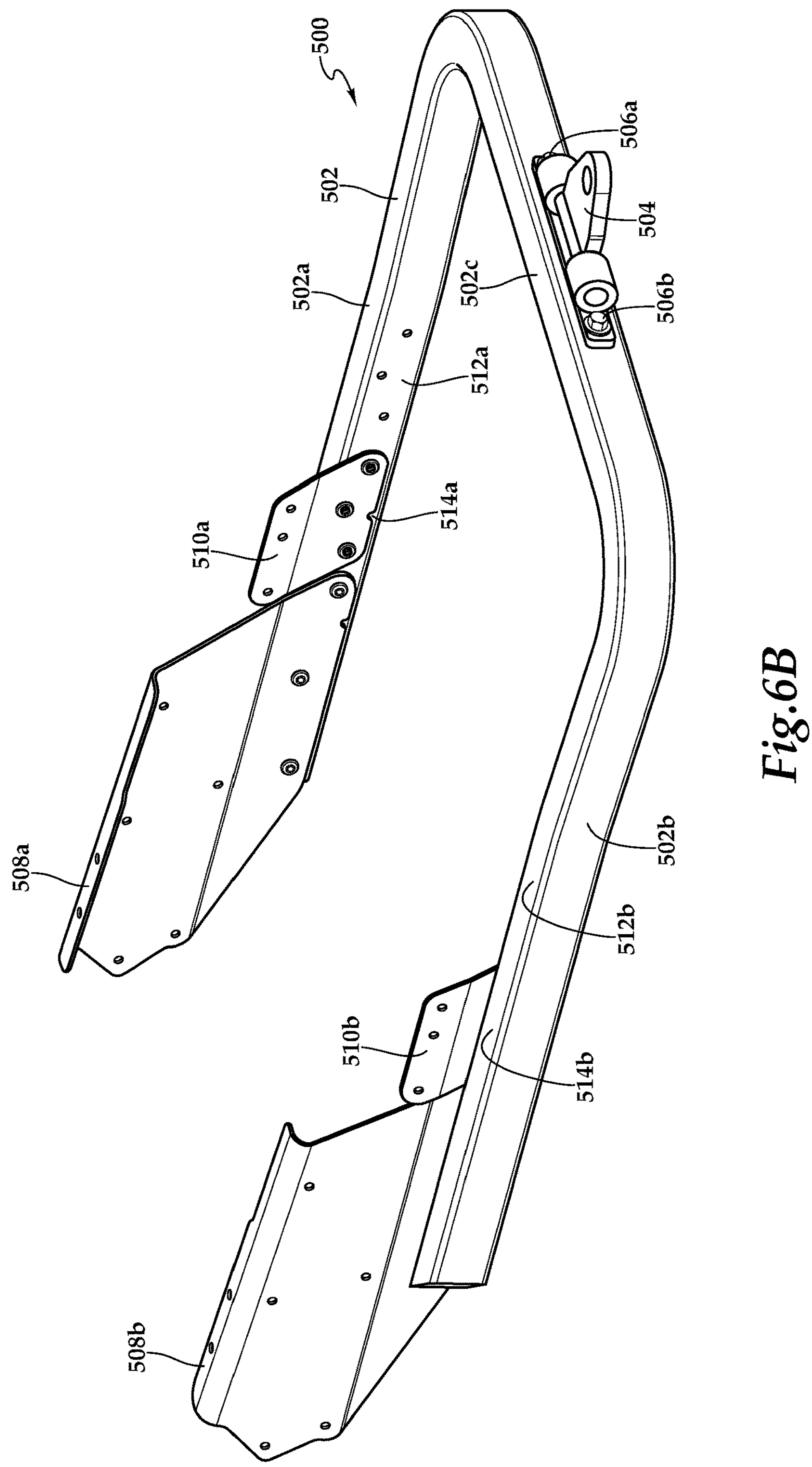

Referring additionally to FIGS. 6A-6B of the drawings, therein is depicted a tow bumper 500 that is configured to be installed on a snowmobile, such as the snowmobiles discussed herein. In the illustrated embodiment, tow bumper 500 is formed from a single tubular member 502 that may be bent or otherwise shaped to include a right side tow member 502*a*, a left side tow member 502*b* and a cross member 502*c*. A towing assembly 504, depicted as a rotatable receiver, is coupled to cross member 502*c* with a pair of bolts 506*a*, 506*b* that pass through bolt apertures in towing assembly 504 and cross member 502*c* to secure towing assembly 504 to tubular member 502. In FIG. 6A, right side tow member 502*a* is coupled to a forward support bracket 508*a* and an aft support bracket 510*a* with a plurality of fasteners such that aft support bracket 510*a* is coupled thereto in one of a plurality of locations for aft support bracket 510*a* along right side tow member 502*a*. Likewise, left side tow member 502*b* is coupled to a forward support bracket 508*b* and an aft support bracket 510*b* with a plurality of fasteners such that aft support bracket 510*b* is coupled thereto in one of a plurality of locations for aft support bracket 510*b* along left side tow member 502*b*. In the illustrated configuration, aft support bracket 510*a* and aft support bracket 510*b* are respectively coupled to right side tow member 502*a* and left side tow member 502*b* at aftmost connection locations 512*a*, 512*b* that preferably include prefabricated hole patterns that correspond with the hole patterns of aft support bracket 510*a* and aft support bracket 510*b*.

In FIG. 6B, right side tow member 502*a* is coupled to forward support bracket 508*a* and aft support bracket 510*a* with a plurality of fasteners such that aft support bracket 510*a* is coupled thereto in a second of a plurality of locations for aft support bracket 510*a* along right side tow member 502*a*. Likewise, left side tow member 502*b* is coupled to forward support bracket 508*b* and aft support bracket 510*b* with a plurality of fasteners such that aft support bracket 510*b* is coupled thereto in a second of a plurality of locations for aft support bracket 510*b* along left side tow member 502*b*. In the illustrated configuration, aft support bracket 510*a* and aft support bracket 510*b* are respectively coupled to right side tow member 502*a* and left side tow member 502*b* at forwardmost connection locations 514*a*, 514*b* that preferably include prefabricated hole patterns that correspond with the hole patterns of aft support bracket 510*a* and aft support bracket 510*b*.

In this embodiment, forward support brackets 508*a*, 508*b* and aft support brackets 510*a*, 510*b* may be used to couple tow bumper 500 to the drive tunnel of multiple snowmobile models that have different tow bumper connection requirements and such that tow bumper 500 may be positioned, for example, below a lift bumper and towing assembly 504 may be positioned, for example, aft of the drive tunnel, aft of the lift bumper, aft of the snow flap, below the lift bumper, below the lift handle and below at least a portion of the snow flap. Even though tow bumper 500 has been depicted and described as having two connection locations; namely, the aftmost and forwardmost connection locations for each of the aft support brackets, it should be understood by those having ordinary skill in the art that the plurality of locations for the aft support brackets could be greater than two such as three, four or more locations. Likewise, even though tow bumper 500 has been depicted and described as having a plurality of connection locations for the aft support brackets, it should be understood by those having ordinary skill in the art that a tow bumper of the present disclosure could alternatively or additionally have a plurality of locations for the forward support brackets.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A bumper system for a snowmobile having a drive tunnel with first and second side panels, the bumper system comprising:
- a lift bumper having first and second side lift members with a lift handle extending therebetween, the first side lift member coupled to the first side panel of the drive tunnel, the second side lift member coupled to the second side panel of the drive tunnel, the lift handle disposed aft of and above the drive tunnel;
- a tow bumper having first and second side tow members with a cross member extending therebetween, the first side tow member coupled to the first side panel of the drive tunnel, the second side tow member coupled to the second side panel of the drive tunnel, the tow bumper positioned below the lift bumper; and
- a towing assembly coupled to the cross member of the tow bumper.

2. The bumper system as recited in claim 1 wherein, the lift bumper further comprises one or more round tubular members that form the first and second side lift members and the lift handle.

3. The bumper system as recited in claim 1 wherein, each of the first and second side lift members includes two substantially straight tubular members having a bend therebetween.

4. The bumper system as recited in claim 1 wherein, the first and second side lift members are respectively positioned outboard of the first and second side panels of the drive tunnel.

5. The bumper system as recited in claim 1 wherein, the tow bumper further comprises one or more square tubular members that form the first and second side tow members and the cross member.

6. The bumper system as recited in claim 1 wherein, the first and second side tow members are respectively positioned outboard of the first and second side panels of the drive tunnel.

7. The bumper system as recited in claim 1 further comprising first and second support brackets respectively coupling the first and second side tow members to the first and second side panels of the drive tunnel.

8. The bumper system as recited in claim 1 further comprising first and second forward support brackets respectively coupling the first and second side tow members to the first and second side panels of the drive tunnel; and
- first and second aft support brackets respectively coupling the first and second side tow members to the first and second side panels of the drive tunnel.

9. The bumper system as recited in claim 8 wherein, the first aft support bracket is selectively couplable to the first side tow member at a plurality of locations; and
- wherein, the second aft support bracket is selectively couplable to the second side tow member at a plurality of locations.

10. The bumper system as recited in claim 1 wherein, the towing assembly further comprises a rotatable receiver.

11. The bumper system as recited in claim 1 wherein, the towing assembly further comprises a hook and latch receiver.

12. A snowmobile comprising:
- a chassis including a drive tunnel having first and second side panels;
- a powertrain coupled to the chassis;
- a drive track disposed at least partially below the drive tunnel, the drive track receiving rotational energy from the powertrain such that the drive track is configured to provide ground propulsion for the snowmobile;
- a lift bumper having first and second side lift members with a lift handle extending therebetween, the first side lift member coupled to the first side panel of the drive tunnel, the second side lift member coupled to the second side panel of the drive tunnel, the lift handle disposed aft of and above the drive tunnel;
- a tow bumper having first and second side tow members with a cross member extending therebetween, the first side tow member coupled to the first side panel of the drive tunnel, the second side tow member coupled to the second side panel of the drive tunnel, the tow bumper positioned below the lift bumper; and
- a towing assembly coupled to the cross member of the tow bumper.

13. The snowmobile as recited in claim 12 wherein, the lift bumper further comprises one or more round tubular members that form the first and second side lift members and the lift handle.

14. The snowmobile as recited in claim 12 wherein, the first and second side lift members are respectively positioned outboard of the first and second side panels of the drive tunnel.

15. The snowmobile as recited in claim 12 further comprising a snow flap coupled to and extending downwardly from the lift bumper; and
- wherein, the towing assembly is positioned aft of the snow flap.

16. The snowmobile as recited in claim 15 wherein, the towing assembly is positioned below at least a portion of the snow flap.

17. The snowmobile as recited in claim 12 wherein, the towing assembly is positioned aft of the lift bumper.

18. The snowmobile as recited in claim 12 wherein, the towing assembly is positioned below of the lift bumper.

19. The snowmobile as recited in claim 12 wherein, the tow bumper further comprises one or more square tubular members that form the first and second side tow members and the cross member.

20. The snowmobile as recited in claim 12 wherein, the first and second side tow members are respectively positioned outboard of the first and second side panels of the drive tunnel.

* * * * *